June 9, 1936.  H. A. FOOTHORAP  2,043,580
WRITING COMPUTING MACHINE
Filed April 25, 1931  5 Sheets-Sheet 1

Inventor
Harry A. Foothorap.
By
Attorney

June 9, 1936.   H. A. FOOTHORAP   2,043,580
WRITING COMPUTING MACHINE
Filed April 25, 1931    5 Sheets-Sheet 3

Inventor
Harry A. Foothorap.

June 9, 1936. H. A. FOOTHORAP 2,043,580
WRITING COMPUTING MACHINE
Filed April 25, 1931 5 Sheets-Sheet 5

Inventor
Harry A. Foothorap,
By
Attorney

UNITED STATES PATENT OFFICE 2,043,580

WRITING COMPUTING MACHINE

Harry A. Foothorap, Harrisburg, Pa., assignor, by mesne assignments, to Underwood Elliott Fisher Company, New York, N. Y., a corporation of Delaware Application April 25, 1931, Serial No. 532,812

18 Claims. (Cl. 235—59)

My invention relates to improvements in writing computing machines of the class embodying a carriage and printing mechanism travelling over the work to different line, letter space, and column positions, and relatively fixed and travelling column and crossfooter registers, respectively, operated through the medium of column and crossfooter register actuators movable step by step past their respective registers by travel of the carriage, and under control of the numeral keys of the machine.

One object of the invention is to provide a machine of this character equipped for the carrying of two column balances, for instance, quantity and value balances, as in stock or inventory taking operations.

Another object is to equip a machine of this class with a plurality of column registers of relatively different capacities, and a crossfooter of the split or dual type embodying a plurality of registers conveniently corresponding in capacities to the column registers, with means for selectively operating column and crossfooter registers of like capacities in correspondence.

In its more specific aspect, the invention contemplates equipping the stationary frame of such a machine with a plurality of registers, the group of totalizer wheels on one of which registers is spaced apart from the group of totalizer wheels of another register, and providing the carriage with another plurality of registers, the groups of totalizer wheels of which are also spaced apart, the spacing between the groups of totalizer wheels of the fixed registers being different from the spacing between the groups of wheels of the traveling registers and individual actuators for the totalizer wheels of each plurality, which actuators travel in correspondence by equal increments of movement across the wheels of corresponding registers, in the respective fixed and traveling groups and differentially between adjacent registers of the respective fixed and traveling groups of registers.

A further object of the invention is to provide for the operation of a plurality of travelling crossfooter registers, (in conjunction with a corresponding plurality of fixed column registers), by a single actuator operatively related to key-locking mechanism in such manner as to lock the keys of the machine in timed relation to the escape of said actuator past each one of the traveling registers.

Still another object is to equip such a machine with actuator-positioning means adapted to be disabled at will to lock out the plurality of travelling crossfooter registers.

Other and subordinate objects will appear in the following description and claims, in conjunction with the drawings forming a part of this specification.

In the drawings,

Fig. 13 is a view in side elevation of a portion of the crossfooter, illustrating a latch bar thereon associated with the key-locking mechanism, and the connections between the latch and the restoring key of the crossfooter.

Fig. 14 is a detail view, illustrating parts of a crossfooter-disabling or disconnecting mechanism, Fig. 15 is a top plan view of the parts shown in Fig. 14, Fig. 16 is a view in rear elevation of parts of the crossfooter actuator-positioning mechanism, and, Fig. 17 is a perspective view of a weighted dog included in the key-locking mechanism.

The illustrated embodiment of the invention has been particularly designed as equipment for the Elliott-Fisher billing machine of commerce. This machine, generally described, includes a line-spacing frame 1 (Fig. 1) suitably mounted for movement over a flat platen (not shown) and supporting a carriage 2 and down-strike typewriting mechanism (not shown), travelling on the frame 1 for letter and column spacing operations, as exemplified in my Patent No. 1,251,361, issued Dec. 25, 1917.

The carriage 2 has mounted thereon a master actuator 3 designed to be intermittently shifted with the carriage through successive steps of equal length, across one or more column registers successively, for denominational selection of the totalizer wheels therein. These registers, as will be understood, are fixed upon a register bar 4, forming part of the line-spacing frame 1, and function to accumulate numbers printed in the various columns.

The master actuator 3, (Fig. 1) is differentially rotated to normally effect addition on the column totalizers, by gearing 5 driven by a shaft 6 actuated by the differential mechanism 7 controlled by the usual numeral keys 8, mounted on the carriage 2.

A shiftable reversing gear (not shown) associated with the gearing 5, and controlled from a special key 9 and link 10, enables the operator to reverse the direction of rotation of the actuator 3, to effect subtraction in the column registers, in a manner similar to that disclosed in U. S. Patent to Foothorap, No. 1,847,429, issued March 1, 1932.

Figure 7:
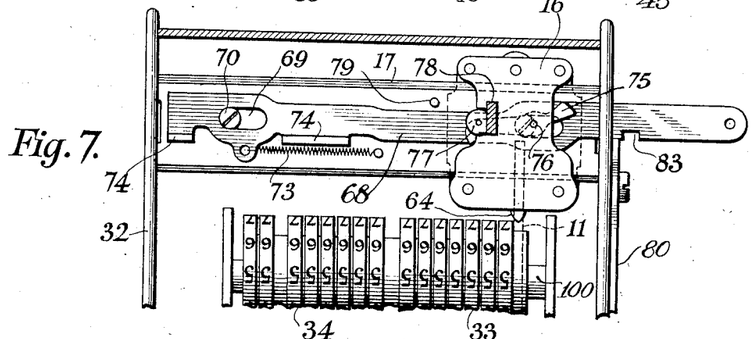
Fig. 7 is a view in rear elevation of a portion of the crossfooter equipped with a pair of travelling registers, a single crossfooter actuator therefor, and key-locking mechanism, the parts being shown in the positions they assume when the slide and other parts are positioned as shown in Fig. 6.
Figure 9:
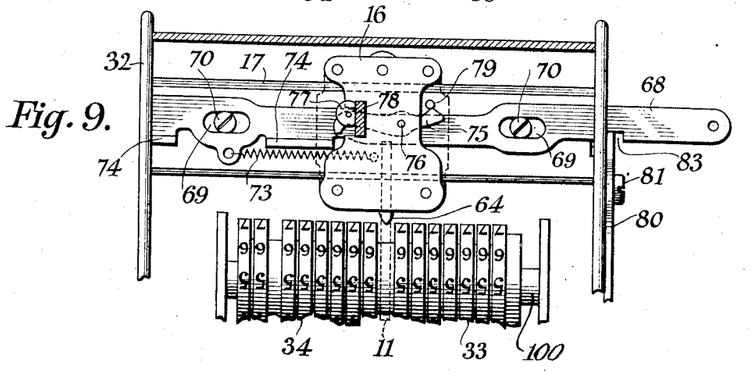
Fig. 9 is a view similar to Fig. 7, illustrating the crossfooter actuator and key-locking mechanism in the positions they assume when the slide is coupled as in Fig. 8.
Figure 10:
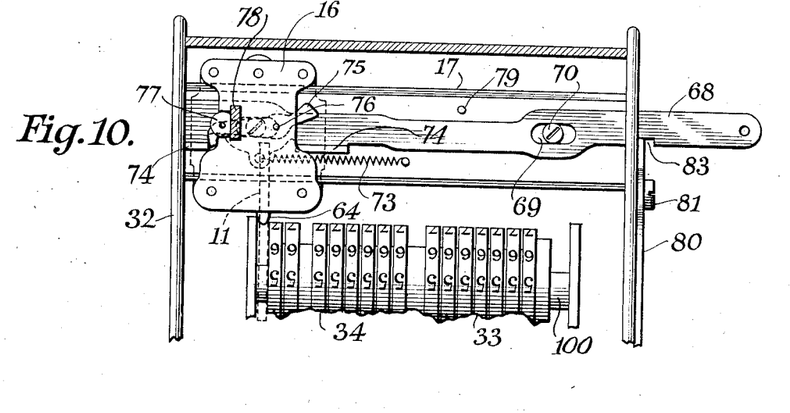
Fig. 10 is a view similar to Fig. 7, illustrating the crossfooter actuator and key-locking mechanism in still another position.
Figure 11:
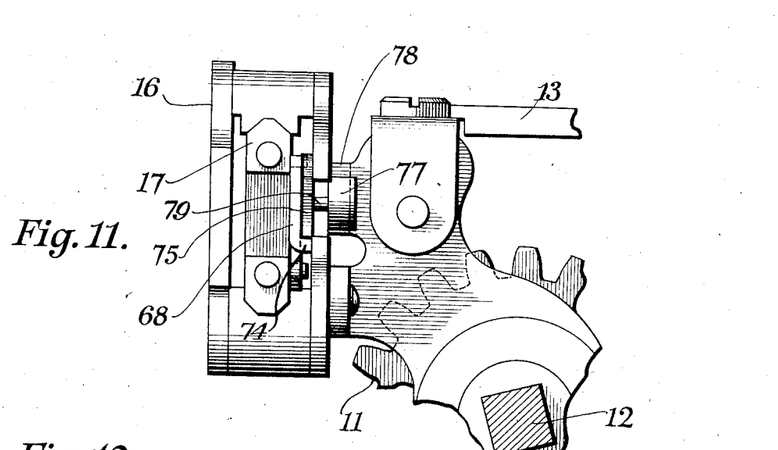
Fig. 11 is a fragmentary view, partly in side elevation and partly in section, of the crossfooter actuator, an actuator carriage therefor, and a guide on which the actuator and carriage move.

As disclosed more in detail in my Patent No. 1,576,961, issued March, 16 1926, these machines are equipped with what is known as a crossfooter or grand totalizer, mounted upon one end of the carriage 2 to travel therewith, and including a crossfooter actuator 11 (Figs. 1, 10 and 11) designed to be advanced laterally for denominational selection along a rotatable squared shaft 12, by a crank arm 13, fast at one end on a suitably journaled vertical counter-shaft 14, and having its opposite end connected by a link 15 to an actuator carriage 16 sliding on a horizontal rail 17, (see also Figs. 7 and 9). The crossfooter actuator 11 (Fig. 1) is differentially rotated simultaneously with the master actuator 3 by means of reversible gearing 18 connecting the shafts 6 and 12 and controlled by the key-operated, differential mechanism in a manner which need not be entered into herein since this mechanism forms per se, no part of the present invention. As will be understood from an inspection of my Patent 1,576,961, the crossfooter includes transfer and transfer-restoring mechanisms, respectively, the latter operated by a transfer-restoring key 19, pivoted at 20 (Fig. 13), and having associated therewith full-stroke mechanism indicated in dotted lines at 21.

Associated with actuator levers 22, (Fig. 1) forming part of the differential mechanism, is keylocking mechanism of the general type disclosed in my Patent No. 1,811,227, issued June 23, 1931, and having the form of pairs of separable key-locking members 23, (Fig. 2) operable by a spreader member 24, and a chain of operating connections 25, 26 and 27 (Figs. 13 and 1) between the spreader and the restoring key 19, to lock said keys 8 against depression during operation of the transfer-restoring key 19.

Figure 8:
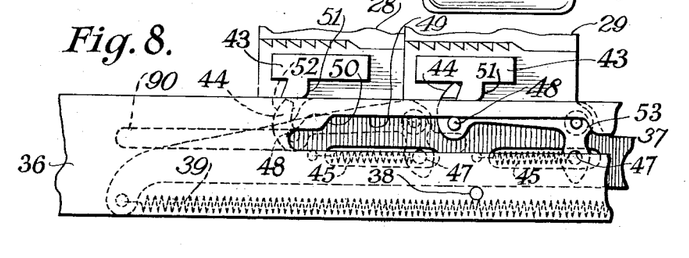
Fig. 8 is a view similar to Fig. 6, showing the parts in the positions they assume when the slide is coupled to the succeeding fixed register.

According to my invention, a set of, say, two column registers 28 and 29 (Figs. 1, 6 and 8) are fixed upon the register bar 4 in contiguous side by side relation for operation by the master actuator 3 in conjunction with the printing of two closely spaced columns of numbers. Each fixed register embodies the usual group of denominational number and indicating wheels 30 and 31, (Fig. 6), respectively, the individual wheels of each group being spaced in correspondence with the steps of denominational movement of the actuator 3.

The registers of said set may be designed for use in connection with columns of amounts designating on the one hand quantities, and on the other hand, values. Since the number of digits in the amounts printed in the quantity column will seldom if ever equal, in denominational orders, those in the value column, and since the use of a closely spaced plurality or set of column registers is contemplated, to economize space, the quantity accumulating register 28 is shown as of smaller capacity than the value accumulating register 29.

The crossfooter (Figs. 2, 7, 9, and 10) is of the dual or split type embodying, for illustration, a quantity and a value register, 33 and 34, respectively, aligned on a single shaft 100 mounted in and extending between suitable side plates mounted in the crossfooter frame 32.

Conveniently, the capacities of the quantity and value crossfooter registers correspond with the capacities of their respective quantity and value column registers 28 and 29, the number wheel and indicating wheel arrangement being the same in all registers.

It is very desirable, at times, to print the quantity and value columns closely adjacent on the record sheet, in which case, the quantity and value column registers are juxtaposed as closely as possible on their supporting frame bar 4.

And as has been stated already, the quantity column register 28 may be of smaller capacity than the value column register 29, which results in a register of less thickness, whereby to afford additional space for unaccumulated data, descriptive wording or the like on the record sheet.

For like reasons, the quantity and value crossfooter registers 33 and 34 are also arranged closely together, but whereas, the crossfooter structure lends itself very readily to such condensed spacing, the removable column registers each constitute a separate unit for use in other relations, and each comprises two side walls between which the operating parts of the register are supported.

The totalizer wheel shaft of each column register extends between the side walls of such register, and the totalizer wheels must be spaced sufficiently apart from one another on the supporting shaft to enable independent rotation of the wheels without frictional engagement with the inner faces of the side walls or with each other.

Furthermore, provision must be made for the clearing or zero-resetting mechanism for each column register, which is arranged, generally, between the units wheel and the adjacent side wall of the register.

Consequently, when two column registers are positioned as closely as possible with their adjacent walls substantially in contact, there is still more space between the units totalizer wheel of the left hand column register and the totalizer wheel of highest order in the right hand column register, than there is between similar wheels in the left and right hand crossfooter registers.

Figure 6:
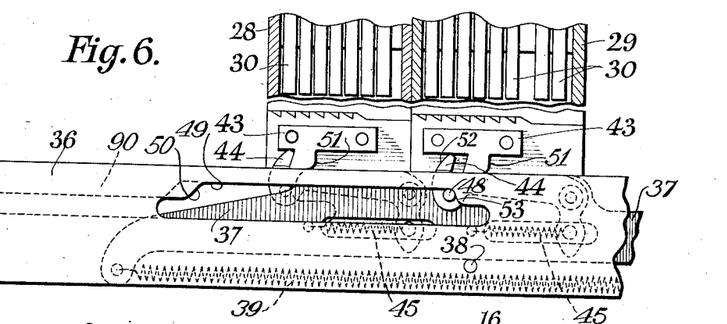
Fig. 6 is a fragmentary view, partly in front elevation and partly in section, of adjacent fixed column registers with coupling members thereon for cooperation with the coupling members on the slide to connect the slide to the registers during the advance of the carriage, the parts being shown in the positions they assume when the slide is initially coupled to the first register.

This difference in spacing is clearly indicated by a comparison of Figures 6 and 7.

In the actual machines, the units wheel of the quantity column register 28 (Fig. 6) is spaced apart from the wheel of highest value in the value column register a distance equal to three steps of travel of the master actuator 3 (Fig. 1) and hence, when it is desired to shift from the quantity column register to the value column register, it is necessary to skip the master actuator 3 a distance of three steps.

Of course, should the digit of highest value in the amount to be entered in the value column register be of less denominational value than the wheel of highest order of such register, it will then be necessary for the master actuator to skip a farther distance, but this additional travel is effected in the usual manner.

The quantity and value crossfooter registers 33 and 34 can be spaced in direct succession with no intervening space, but in the present instance, in order to provide a supporting wall (not shown) to brace the register wheel shaft 100 intermediate its ends, the quantity and value crossfooter registers are spaced apart a distance equal to one step of travel of the master actuator 3.

Since the master wheels 3 and 11 must simultaneously engage wheels of corresponding denomination in the column and crossfooter registers, respectively, it is necessary to provide means to enable the master actuator 3 for the column registers to advance three steps of travel between registers arranged as above set forth, while the net advance simultaneously imparted to the crossfooter actuator 11 amounts to two steps, when a change is to be made from one register to another.

It should be understood that once a mechanism to effect these results, is determined, it may be readily arranged to cause the master actuator 3 to jump or skip from the units wheel of the quantity column register 28 to the wheel of highest order in the value column register 29, (three letter spaces apart in the present instance) simultaneously with the jumping of the crossfooter actuator 11 from the units wheel of the quantity crossfooter 33 to the wheel of highest denomination of the value crossfooter register 34, a distance of two steps.

However, the present illustration of the invention contemplates skipping the master actuator 3 from the units wheel of the quantity column register 28 to a point one step short of the wheel of highest denomination in the value column register 29, two steps distant, while the crossfooter actuator 11 is being jumped a single space from the units wheel of the quantity crossfooter register 33 to a point one step short of the wheel of highest order in the value crossfooter register 34, and the following description is based upon this relative difference in spacing between the adjacent column registers and the adjacent crossfooter registers. Such relative difference might be according to any other reasonable requirements.

In the present instance, the spacing between the travelling crossfooter registers corresponds to a single step of movement of the master actuator 3 to facilitate reading of the travelling registers. Obviously, since the spacing of adjacent wheels of the individual registers corresponds in both the fixed and travelling registers, and is relatively different between the groups of totalizer wheels of the registers of the fixed and travelling sets, the actuators 3 and 11 must be arranged to travel in correspondence across their respective registers, and differentially therebetween. To accomplish this result, the following actuator-positioning mechanism is provided.

Mounted on the carriage 2, as by brackets 35, (Fig. 1), is a pair of laterally spaced horizontal guide bars 36 which travel endwise with the carriage 2. Intermediate said bars 36 and parallel therewith is a horizontal slide member 37 (Figs. 3, 4 and 8) supported by rollers, as at 38, for movement endwise with the carriage, or independently thereof. A retractile spring 39 having its opposite ends suitably connected to the slide member 37 and to one guide bar 36, respectively, urges the slide member 37 in the direction of advance movement of the carriage 2, in which direction its movement is limited by means presently described, which normally arrests the slide at its home position. A link 40 (Fig. 1) connects one end of the slide member 37 to a rearwardly projecting crank arm 41 fast on the vertical counter-shaft 14, so that if the slide member 37 is held stationary, it will effect a step by step rotation of the shaft 14 due to the travel of the counter-shaft 14 with the carriage 2, to advance the crossfooter actuator 11 step by step from a normal position, shown in Figs. 1 and 7, and in correspondence with the step by step movement of the master actuator 3. Obviously if the slide member 37 is subsequently released from the part which prevents the slide from accompanying the carriage in its letter spacing travel, the spring 39 will act to return said slide towards its home position and will rotate the shaft 14 in the reverse direction, and retract the actuator 11 towards its normal position relatively to the crossfooter registers.

Co-operating means are provided on the fixed registers and slide member, respectively, to releasably hold the slide stationary, as follows: Suitably secured to each of the fixed registers 28 and 29, (Figs. 6 and 12), in position to overlie the slide member 37, is a stationary coupling cam member 43. Pivoted on the slide member 37, (Figs. 4, 5, and 6), is a set of individually operable coupling hook members 44 vertically movable to and from coupling position relatively to the respective coupling cam members 43, and urged toward coupling position by individual springs 45 having their opposite ends connected to the hook and slide members, respectively, as at 46 and 47.

Conveniently, the movable coupling members 44 are successively mounted on opposite sides of the slide member 37, which arrangement provides for a relative offsetting or spacing of the successive coupling members, both fore and aft, and transversely, relatively to the machine.

Similarly, the stationary coupling members 43 on the column registers are offset fore and aft (see Fig. 12) as well as spaced apart transversely of the machine, the spacing between the coupling members 43 transversely of the machine, that is, in the direction of travel of the carriage, being of greater extent than the interval between the successive movable couplings 44.

Figure 12:
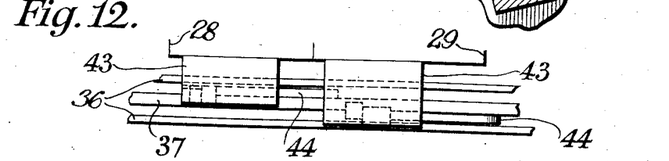
Fig. 12 is a top plan view, illustrating the relative spacing of the coupling members in the fixed column registers and the slide, respectively.

By offsetting the stationary cam members 43, fore and aft as shown in Fig. 12, the respective offset shiftable hooked members 44 are rendered individual to the appropriate column registers, so that each co-acts with its own cam member 43 without interference with the cam members of other registers.

In the embodiment of the invention selected for illustration, the cam members 43 are located at such predetermined points on their respective registers, as to be engaged by their co-operative hooked members 44 at the time the master actuator 3 lies one step to the left of the wheel of highest order of the respective registers, and the extent of separation of the successive hooked coupling members 44 in the direction of travel of the carriage is determined by the distance between successive cam members 43, less the distance substantially equivalent to the difference in spacing between the adjacent column registers and the adjacent crossfooter registers, respectively.

To practically illustrate this condition, assume that the distance between the point one step to the left of the wheel of highest order of the "quantity" column register 28, and the point one step to the left of the wheel of highest order of the "value" column register, is nine steps, and that there are seven "quantity" totalizer wheels.

A movement of seven steps imparted to the carriage 2 and its master actuator 3 is sufficient to bring the master actuator into mesh with the units wheel of the "quantity" column register from which position it is desired to skip the carriage 2 and master actuator 3 a distance of two steps to locate the master actuator one step to the left of the wheel of highest order in the "value" column register.

It will be remembered that because of the coupling of the positioning slide 37 to the "quantity" column register 28 coincident with the arrival of the master actuator 3 at the point one step to the left of the wheel of highest order in the "quantity" column register, the crossfooter actuator 11, the normal home position of which is one step to the left of the wheel of highest order in the "quantity" crossfooter 33, will step across the wheels of the "quantity" crossfooter simultaneously with the traverse of the "quantity" column register wheels by the master actuator 3, the two actuators 3 and 11 arriving at the units wheels of their respective registers 28 and 33 at the end of the seventh step.

It now becomes necessary to advance the master actuator 3 and its carriage 2, two steps of travel, while the crossfooter actuator 11 is held to one step of travel only.

Ordinarily, the crossfooter actuator would advance two steps to accord with the advance of the master actuator 3, but to reduce the amount of travel imparted to the crossfooter actuator 11, the distance in the direction of carriage travel between the shiftable coupling members 44 is less by one step than the distance between the co-acting coupling members 43.

As a result, upon the automatic release of the first hooked coupling member 44 from its co-acting stationary coupling member 43, accompanied by the automatic release of the carriage and its master actuator 3 from the line space mechanism (through means, not shown, similar to that shown in patent to Smith, 1,001,698, August 29, 1911) the carriage commences its two-step movement under the influence of the usual carriage spring.

As the carriage, with which travels the master actuator 3 and the crossfooter 33, 34, completes the first of the two steps, the second coupling member 44 lies in substantial contact with the second stationary coupling member 43, so that as the carriage 2 with its master actuator 3 continues on its second step to position the master actuator one place to the left of the wheel of highest order of the "value" column register, the engagement of the two coupling members causes a partial counter-clockwise rotation of the vertical shaft 14 and arms 41 and 13 to advance the crossfooter actuator 11 a single space only, the crossfooter registers 33 and 34 having advanced two steps with the carriage 2, thereby resulting in positioning the crossfooter actuator 11 one step to the left of the "value" crossfooter 34.

As indicated most clearly in Fig. 6, the fixed coupling members 43 are spaced farther apart in the direction of carriage travel than are the movable coupling members 44, the difference in the spacings being equal to the excess travel it is desired to afford the main actuator 3 over the crossfooter actuator 11.

Thus, if it is desired to advance the main actuator 3 four steps of travel to one step of advance of the crossfooter actuator 11, the difference in spacing between the successive fixed coupling members 43 and the movable coupling members 44 would be as 4 to 1, instead of 2 to 1, as shown, so that the slide member 37 may be successively coupled to the fixed registers 28 and 29 by advance of the carriage 2, and thus held stationary during the advance of the master actuator 3 past each fixed column register. Obviously, when the slide member 37 is thus coupled to either fixed register 28 or 29, the actuator 11 will be advanced across the associated travelling register 33 or 34 coincident with the advance of the master actuator 3 across the corresponding fixed column register. In Fig. 6, the slide member 37 is shown at the initial point of coupling to the first register 28, the corresponding positions of the master and crossfooter actuators 3 and 11 being shown in Figs. 1 and 7, respectively, and in Fig. 8, the slide member 37 is shown as coupled to the succeeding column register 29, the corresponding position of the crossfooter actuator 11 being shown in Fig. 9, it being understood that the actuator 3 is now in the same relative position with respect to the succeeding register as that shown in Fig. 1 in connection with the first register. It will be understood that in the interval elapsing between the moment at which the first movable coupling member 44 becomes uncoupled from its fixed coupling member 43, and the moment at which the engagement of the next movable coupling member 44 with its fixed coupling member 43 occurs, the master actuator 3 advances from the last or units number wheel 30 of the first register 28 to within one step of the first or highest denomination number wheel 30 of the succeeding register 29, a distance, in this instance, equal to at least two steps of movement of said actuator, whereas, the crossfooter actuator 11 is located intermediate the travelling registers 33, 34, that is, in a position one step in advance of the travelling register 34. This differential movement of the actuators 3 and 11 is effected by virtue of the previously noted difference in spacing in the direction of carriage travel between the coupling members 43 and 44, which permits the spring 39 to retract the actuator 11 substantially one step between coupling operations, or in other words, after it passes the first register 33, as will be clear.

The coupling hook members 44 are moved to uncoupling position successively, by co-operating means on the guide bars 36 and movable coupling members 44, respectively, rendered operative by travel of the carriage 2, as follows. Each coupling hook member is provided with a laterally projecting pin 48, (Fig. 4), and each guide bar 36 has formed therein a longitudinal cam slot 49 receiving, respectively, the pin 48 of the adjacent hook member 44. At an appropriate point in its length, each slot 49 is contracted to provide hook-depressing cam faces 50 with which the pins 48 may be engaged by travel of the carriage 2, to successively move the hook members 44 into uncoupling position in timed relation to movement of the actuator 3 past the last or units number wheel 30 of the successive fixed column registers 28 and 29. It will be noted that, by virtue of moving the coupling hooks 44 to uncoupling position successively, associated registers of the fixed and travelling groups may be operated selectively in unison.

Figure 3:
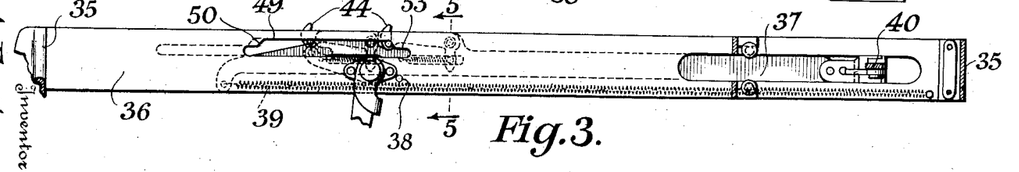
Fig. 3 is a view in front elevation of guide bars and a slide mounted on the carriage, and forming part of the mechanism for imparting movement to the crossfooter actuator.

The slots 49 in the guide bars 36, instead of lying in alinement, are relatively offset, as indicated in Figs. 3 and 6, such offset corresponding in degree with the difference in spacing intervals of the hook coupling members 44, when contrasted with the spacing interval between the fixed coupling members 43.

Furthermore, to enable the continued travel of the key carriage and guide bars 36, while the right hand (Fig. 6) movable coupling 44 is engaged with the right hand fixed coupling 43, the cam slot 49 associated with the left hand coupling member 44 is provided with a restricted extension 90 to accommodate the stud or projection 48 of the left hand coupling member 44.

For the purpose of permitting ready retraction of the carriage 2, the coupling members 43 and 44 (Figs. 6 and 8) are provided with co-operating cam faces 51 and 52, respectively, adapted to cam the hook members 44 downwardly to uncoupling position upon the return of the carriage 2 and movable coupling members 44 towards the left hand margin, it being understood that the slots 49 are of sufficient depth to permit the requisite play of the pins 48 therein. At another point in their lengths, each cam slot 49, (Figs. 3, 6, and 8), is provided with a hook depressing cam face 53 with which the respective pins 48 may contact by a slight independent movement of the slide 37 from its normal position, in the direction of advance movement of the carriage 2, to depress and retain said hook members in uncoupling position as long as the slide is held in such advanced position.

It is sometimes desired that the cross totalizer remain idle, to which end, means is provided to enable the operator to readily control the operativeness or inoperativeness of the cross totalizer, one embodiment of which utilizes this adjunctive travel of which the slide 37 is capable.

The mechanism for imparting such abnormal advance to the slide 37 whereby to silence the cross totalizer, and for retaining the slide in such advanced position to maintain the cross totalizer ineffective, is conveniently mounted in the cross totalizer frame 32.

The slide advancing mechanism includes a disabling or disconnect key 54, (Fig. 14), pivoted at 55 to the crossfooter for vertical rocking movement, to oscillate a segment 56 depending from said pivot 55, and preferably integral with said key. Said key and segment are movable from a normal to a disabling or disconnecting position, and are yieldingly latched in either position, by a pivoted latch member 57 urged by a spring 58 into notches 59 in the edge of the segment 56. At a suitable point, the segment 56 is recessed, as at 60, to co-act with a subjacent stop arm 61 fast on the counter-shaft 14, and in the normal position of the key and segment, the stop arm 61 is limited in its clockwise travel by contact against one edge 62 of the recess, whereby the slide 37, and hence the rest of the crossfooter actuator moving mechanism, is held in normal position against adjunctive advancing movement under the urge of the spring 39. Because of the curvature of the segment 56, however, the stop arm 61 clears the opposite wall 63 of the recess 60 during rotation of the counter-shaft 14 in the normal actuator-advancing operations. Rocking the key 54 and segment 56 to shift the parts from the normal position shown in Fig. 14 to the opposite limit of their travel, termed the "disconnect" position, operates to withdraw the arresting wall 62 from the stop arm 61 on the vertical shaft 14, thereby freeing the stop arm 61, counter-shaft 14, and slide 37 to the action of the spring 39, which thereupon advances the slide 37 past its normal limit of travel in one direction. The slide 37, as it advances through such adjunctive travel, rotates the counter-shaft 14 and stop arm 61 to cause the latter to follow and be limited in its travel by the receding arresting wall 62.

The shiftable coupling members 44 travel with the slide 37 in letter spacing direction relatively to the carriage 2, which is stationary at this time, thereby causing the studs 48 on the respective coupling members 44 to contact the shoulders 53 at the leading ends of the slots 49 in the guide bars 36 and be cammed downwardly thereby, together with the coupling members 44, the studs 51 being drawn into the restricted leading ends of the slots 49 to retain the hooked couplings 44 in their ineffective positions.

In this position of the parts, the wall 63 of the recess 60 will have been rocked downwardly to lie in the path of the stop arm 61 and block return movement of the stop arm 61, and hence, prevents the crossfooter actuator-positioning mechanism from movement in an actuator-advancing direction.

Figure 1:
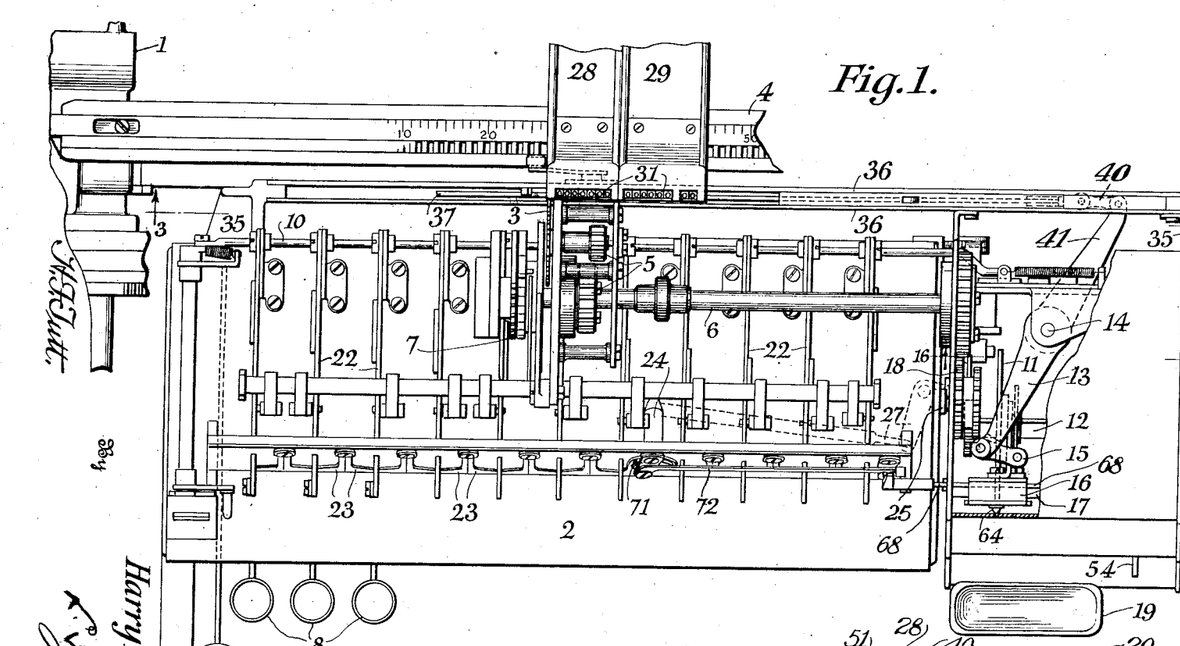
Figure 1 is a top plan view, illustrating a portion of a machine of the class previously designated, equipped according to the invention.
Figures 2, 4, 5:
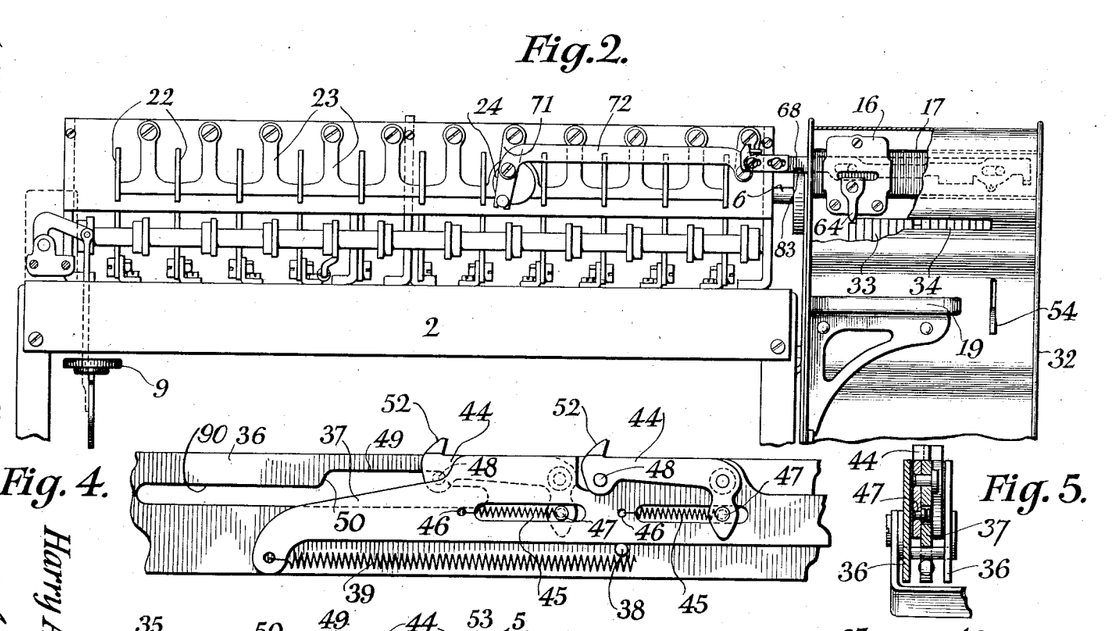
Fig. 2 is a view in front elevation.
Fig. 4 is a fragmentary side view, of a part of the same mechanism, with one of the guide bars removed, and the parts drawn to an enlarged scale.
Fig. 5 is a vertical transverse section taken on the line 5—5 of Fig. 4.

As an incident to the silencing or disconnection of the crossfooter, by enabling the slide 37 to advance beyond its normal home position, the actuator 11 is retracted to the left from its normal position, shown in Figs. 1 and 7. The ineffective condition of the crossfooter may be suitably indicated, as by the position of a suitably displayed signal 64, (Fig. 1), located on the crossfooter actuator carriage 16.

Figures 13, 14, 15, 16, 17:
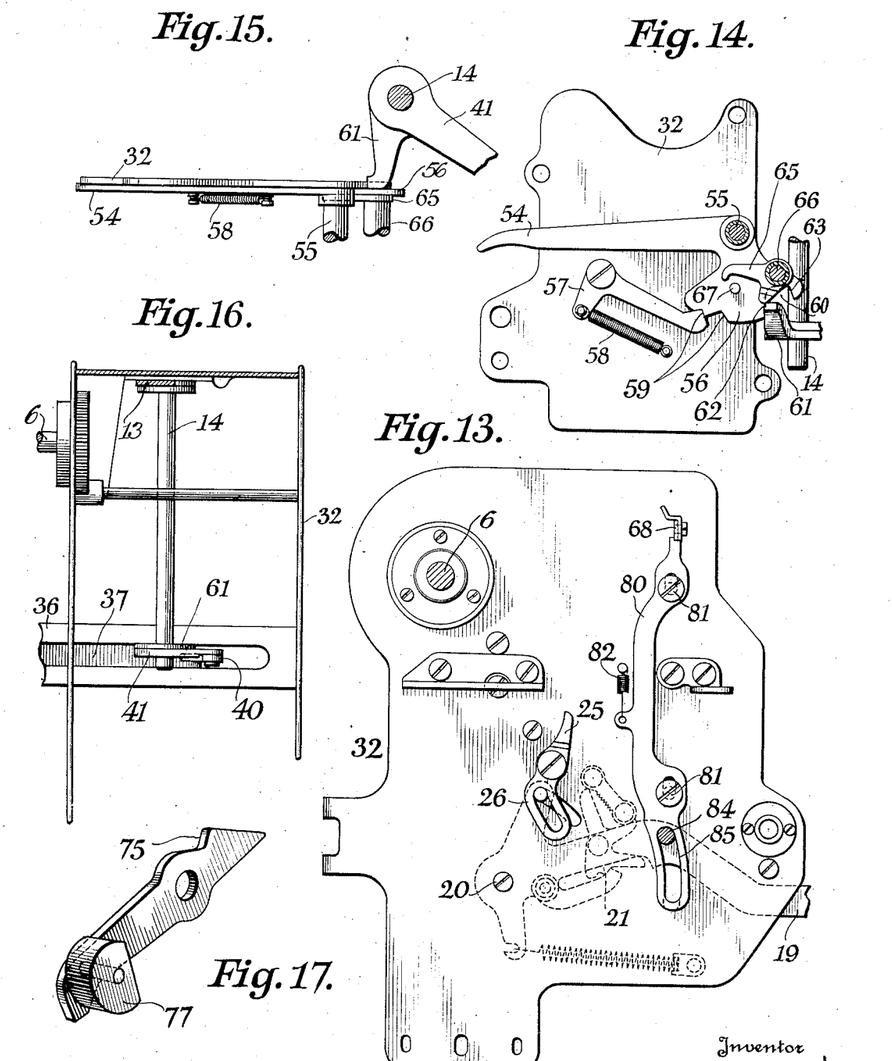

To restore the crossfooter actuator 11 and its control means to effective position the operator merely rocks downwardly the handle 54, to shift the segment 56 counter-clockwise back to the normal position shown in Fig. 14, with sufficient force to overcome the tension of the spring-pressed locking pawl 57 and the spring 39 of the slide member 37. The arresting wall 62 of the recess 60 rocks the stop arm 61 and counter-shaft 14 counter-clockwise, and with them the radial arms 13 and 41 fast on the counter-shaft. Counter-clockwise travel of the radial arm 41 shifts the slide member 37 to the left (Fig. 1) relatively to the guide bars 36 and against the tension of spring 39, to disengage the studs 48 of the movable coupling members 44 from their restricted seats beneath the shoulders 53 and enable the springs 45 to rock the movable coupling members upwardly to again position their hooked ends in line with the fixed coupling members 43. Meanwhile the radial arm 13 will shift the crossfooter actuator carriage 16 to the right, to bring the crossfooter actuator 11 with its signal 64 to the positions shown in Fig. 1. The spring-pressed detent 57 (Fig. 14) will lock the segment 56 and handle 54 where adjusted.

In conjunction with the crossfooter disabling mechanism, means are provided for blocking operation of the crossfooter disabling key 54 after advance of the crossfooter actuator 11 from its normal position in the ordinary operation of the machine, to thereby prevent improper use of the key during actuator-advancing operations. Such blocking means includes a gravity dog 65 pivoted at 66 on a suitable part of the crossfooter frame 32, and tending to engage a pin 67 on the "disconnect" segment 56 to lock the segment and the key 54 against movement from normal position. In the normal position of the crossfooter actuator-positioning mechanism, the dog 65 is held disengaged from the pin 67 by the stop arm 61. However, coincidently with initial movement of the actuator-positioning mechanism to advance the crossfooter actuator 11 from its position shown in Fig. 7, the stop arm 61 retracts from the dog 65 and the latter drops into locking position.

Coming now to the key-locking mechanism. Mounted in the crossfooter frame 32, preferably on the rear face of the rail 17, is a key-locking bolt 68 (Figs. 7, 9 and 10), slotted at 69 for limited longitudinal travel on studs 70, from its normal position shown in Fig. 7, to its effective position, shown in Fig. 9, in the direction of movement of the crossfooter actuator 11 and actuator carriage 16. At one end, the key-locking bolt 68 is operatively connected to the spreader 24, as by the link and arm connection 71 and 72, (Figs. 1 and 2), respectively, to lock the keys by its movement in the direction of advance movement of the actuator 11. A suitably connected spring 73 tends to return the key-locking bolt 68 to, and retain it in its normal idle position.

Mounted on the key-locking bolt 68 and actuator carriage 16, are co-operating coupling devices. These coupling devices are designed for operation to couple the bolt 68 to the actuator carriage 16, intermittently, in timed relation to the advance of the actuator 11 past each crossfooter register, so that said bolt is advanced with the carriage 16 to lock the keys 8, first, when the actuator 11 has advanced to a position intermediate the first and second traveling registers, and secondly, when the actuator 11 has advanced to a position beyond the second traveling register, respectively. Since the actuators 3 and 11 move in synchronism, this timing of the above coupling and key-locking operations applies also with reference to the advance of the actuator 3 to similar positions relatively to the successive plurality of fixed registers 28 and 29.

The coupling devices on the key-locking bolt 68 may conveniently include laterally projecting lugs 74 suitably spaced thereon for successive engagement by a coupling member on the actuator carriage 16 having the form, preferably, of a vertically rocking dog 75 pivoted intermediate its ends, as at 76, on the actuator carriage. One end of the dog 75 is weighted at 77 to normally drop, by gravity, into intercepting position relatively to the lugs 74, said weight bearing against a fixed part of the carriage 16, as at 78, to limit movement of the dog in this direction. The tail of the dog 75 is adapted to wipe under a pin 79 on the rail 17 to elevate the weighted end of said dog into disengaged position as the actuator carriage advances. The relative arrangement of the lugs 74, dog 74 and pin 79 is such that the dog is engaged with one lug 74 to move the key-locking bolt to locking position, and is then disengaged therefrom, during substantially a single step of advance movement of the actuator 11 past the units number wheel of the first travelling register 33, as will be seen upon inspection of Fig. 9. Upon continued advance of said actuator 11 and its carriage 16, the dog 75 is permitted to drop upon said lug 74 and to ride off the same, whereupon it assumes its normal position to engage the next lug 74 and again move the key-locking bolt 68 to locking position in the same timed relation to advance of the actuator 11 past the units number wheel of the succeeding register 34, as shown, for instance, in Fig. 10.

In the preferred practice of my invention, the key-locking mechanism is designed to enforce the performance of a transfer-restoring operation in connection with each of the traveling registers, as a condition precedent to further operation of the number keys 8, for a purpose which will be understood. To this end, a latch bar 80, (Figs. 7, 9, 10 and 13), is mounted on the crossfooter frame 32, at 81, the upper end of which latch bar is urged by a suitably connected spring 82 into a notch 83 in one edge of the key-locking bolt 68, after each of the before-described key-locking movements of said bolt to hold said keys locked. The latch bar 80 is operatively connected to the transfer-restoring key 19, by the pin 84, and slot 85, for retraction from the notch 83, coincident with the operation of the key 19 to effect a transfer-restoring operation. At the end of such operation of the restoring key 19, the key-locking bolt 68 is returned to unlocking position by its spring 73, as will be clear.

The foregoing constitutes a detailed description of a preferred embodiment of my invention, but it is to be understood that right is herein reserved to changes and modifications falling within the scope of the claims.

What I claim is:

1. In a machine of the class described, the combination of a plurality of spaced sets of column register wheels; a plurality of spaced sets of crossfooter register wheels, the spacing between adjacent sets of column register wheels differing from the spacing between adjacent sets of crossfooter wheels; an actuator common to several sets of column register wheels, the column register wheels and their actuator being relatively shiftable in letter spacing direction; an actuator common to several sets of the crossfooter register wheels, the crossfooter register wheels and their actuator being relatively shiftable in letter spacing direction, to enable a complete traverse of the actuator and the plurality of crossfooter registers relatively to each other by intermittent continuous movement, before restoration to their initial positions; and means to effect relative shifting of the corresponding sets of column and crossfooter register wheels and their respective actuators through like increments of movement during the entry of amounts therein, and through unlike increments of movement after the entry of an item in one corresponding pair of column and crossfooter registers, and prior to the entry of an item in the adjacent corresponding pair of column and crossfooter registers during the complete traverse of the actuator and the alined cross footer registers, relatively one to the other, without restoration to their initial positions.

2. In a writing-computing machine, the combination with a frame, a plurality of spaced sets of column register wheels mounted on the frame; a carriage adapted to travel relatively to the frame; an actuator on the carriage adapted to travel therewith past the successive sets of column register wheels to engage the latter; and a plurality of spaced sets of crossfooter register wheels mounted on the carriage to travel therewith; of an actuator mounted in the carriage and shiftable relatively thereto and to the sets of crossfooter register wheels, to operate the latter successively; and positioning mechanism for the crossfooter actuator, including coupling members associated with the respective sets of column register wheels; a shifting element supported for movement on the carriage; a plurality of coupling members mounted in spaced relation on the shifting element, and engageable with and disengageable from the coupling members associated with the respective sets of column register wheels in succession, to control the traverse of the crossfooter actuator across the sets of crossfooter register wheels successively.

3. In a writing computing machine, the combination with a frame; a plurality of spaced sets of column register wheels mounted on the frame; a carriage adapted to travel relatively to the frame; an actuator on the carriage adapted to travel therewith past the successive sets of column register wheels to engage the latter; and a plurality of spaced sets of crossfooter register wheels mounted on the carriage to travel therewith; of an actuator mounted in the carriage and shiftable relatively thereto and to the sets of crossfooter register wheels, to operate the latter successively; and positioning mechanism for the crossfooter actuator, including coupling members associated with the respective sets of column register wheels; a shifting element supported for movement on the carriage; a plurality of coupling members mounted in spaced relation on the shifting element, and engageable with and disengageable from the coupling members associated with the respective sets of column register wheels in succession, to control the traverse of the cross footer actuator across the sets of cross footer register wheels successively, the spacing between the successive members mounted on the shifting element differing in extent from the spacing between the successive coupling members associated with the sets of column register wheels.

4. In a writing-computing machine, the combination with a frame; a plurality of spaced sets of column register wheels mounted on the frame; a carriage adapted to travel relatively to the frame; an actuator on the carriage adapted to travel therewith past the successive sets of column register wheels to engage the latter; and a plurality of spaced sets of crossfooter register wheels mounted on the carriage to travel therewith; of an actuator mounted in the carriage and shiftable relatively thereto and to the sets of crossfooter register wheels, to operate the latter successively; and positioning mechanism for the crossfooter actuator, including relatively offset coupling members associated with the respective sets of column register wheels; a shifting element supported for movement on the carriage; a plurality of relatively offset coupling members mounted in spaced relation in the direction of carriage travel, on the shifting element and successively engageable with and disengageable from the correspondingly offset successive coupling members associated with the respective sets of column register wheels, to control the traverse of the crossfooter actuator across the sets of crossfooter register wheels successively.

5. In a writing-computing machine, the combination with a frame; a carriage adapted to travel relatively thereto; and a plurality of aligned registers travelling with the carriage; of an actuator normally occupying a position to the left of the left hand register, and adapted to advance across the registers during the advance of the carriage; and means to cause the actuator to traverse the registers successively before returning to its home position, including a positioning member slidable relatively to the carriage and connected with the actuator; a spring to restore the actuator to its home position; a set of relatively spaced coupling members in fixed relation on the frame; a set of coupling members in spaced relation on the slidable member and engageable with and disengageable from the set of fixed coupling members as the carriage advances in letter spacing direction, the spacing interval between the coupling members on the frame differing in extent from the spacing interval between the coupling members on the slide.

6. In a writing-computing machine, the combination with a frame; and a carriage traveling relatively thereto; of a plurality of column registers fixed on the frame; a plurality of crossfooter registers arranged on the traveling carriage and stationary relatively thereto; a column register actuator mounted to travel with the carriage across the successive column registers; a crossfooter actuator mounted on the carriage to travel therewith, and also relatively thereto across the crossfooter registers; a pick-up member connected with the crossfooter actuator; coupling members shiftably mounted in spaced relation on the pick-up member; complementary coupling members on the respective column registers to which the first-named coupling members bear a predetermined relation, to individually co-act with the coupling members on the co-related column registers; means to restore the pick-up member and its crossfooter actuator to their home positions; and means to disable the successive coupling members as their related column totalizers pass one at a time out of the computing zone, to free the crossfooter register actuator to the action of its restoring means.

7. In a writing-computing machine, the combination with a plurality of alined column registers, and an actuator therefor; a plurality of alined crossfooter registers corresponding and paired with the respective column registers, and an actuator therefor, the column and crossfooter registers being mounted for relative bodily movement; of means to enable synchronous accumulation upon each pair of column and crossfooter registers after another, irrespective of a difference in the spacing interval between the successive column registers as compared with the different spacing interval between successive crossfooter registers, including a coupling member associated with each column register, the coupling members being relatively offset; a single pick-up beam connected with the crossfooter actuator; a plurality of shiftable coupling members mounted in spaced relation on the pick-up beam and relatively offset to co-act one after another with the coupling members associated with the immediately successive column registers; means to restore the pick-up beam and crossfooter actuator to their home positions; means to normally retain the shiftable coupling members in effective position to engage their respective co-acting coupling members on the column registers; and separate means individual to and operable upon the respective shiftable coupling members as their corresponding column registers pass out of the computing zone, to disengage the coupling members and free the pick-up beam and crossfooter actuator to the action of the restoring means.

8. In a writing-computing machine, the combination with a plurality of alined column registers, and an actuator therefor; a plurality of alined crossfooter registers corresponding and paired with the respective column registers, and an actuator therefor, between the column and crossfooter registers being mounted for relative bodily movement; of means to enable synchronous accumulations upon each pair of column and crossfooter registers after another, irrespective of a difference in the spacing interval between the successive column registers as compared with the spacing interval between successive crossfooter registers, including a coupling member associated with each column register; a single pick-up beam connected with the crossfooter actuator; a plurality of shiftable coupling members mounted in spaced relation on the pick-up beam to co-act one after another with the coupling members associated with the immediately successive column registers; means to restore the pick-up beam and crossfooter actuator to their home positions; means to normally retain the shiftable coupling members in effective position to engage their respective co-acting coupling members on the column registers; guide rails between which the pick-up beam travels, the respective rails having individual cam slots formed therein for the respective shiftable coupling members; one of which cam slots is provided with an extension of a length corresponding to the length of the cam slot in the opposite guide rail for the next adjacent coupling member; and projections on the respective shiftable coupling members accommodated in and traversed by the respective cam slots in the guide rails, to render their respective coupling members ineffective as the units digit is registered on the corresponding column and crossfooter registers, the projection for one of the coupling members adapted to traverse the extension of its cam slot during the engagement of the succeeding shiftable coupling member with its co-acting coupling.

9. In a writing-computing machine, the combination with a column register, and an actuator therefor; a crossfooter register, and an actuator therefor, the column and crossfooter registers being mounted for relative bodily movement; of means to enable synchronous accumulation upon the pair of column registers and crossfooter registers, including a coupling member associated with the column register a pick-up beam connected with the crossfooter actuator; a shiftable coupling member mounted on the pick-up beam to co-act with the coupling member associated with the column register; means to restore the pick-up beam and crossfooter actuator to their home positions; means to normally retain the shiftable coupling member in effective position to engage its co-acting coupling member on the column register; guide rails between which the pick-up beam travels, one of the rails having a cam slot formed therein, with a shoulder to restrict the cam slot; a projection on the shiftable coupling member entered in the slots; and an adjustable stop to normally arrest the pick-up beam and the crossfooter actuator in their home positions, wherein the projection of the shiftable coupling member clears the shoulder of its cam slot to enable the coupling member to remain effective, said stop being manually retractable to enable the restoring means to advance the pick-up beam and crossfooter actuator to extra limital positions, during which additional travel, the projection on the coupling member wipes along the cam shoulder to shift its coupling member to ineffective position and silence the crossfooter register.

10. In a writing-computing machine, the combination with a column register, and an actuator therefor; a crossfooter register, and an actuator therefor, with provisions for relative bodily movement between the column and crossfooter registers; of means to enable synchronous accumulation on the column and crossfooter registers, including a coupling member associated with the column register a pick-up beam connected with the crossfooter actuator; a shiftable coupling member on the pick-up beam to co-act with the coupling member associated with the column register; means to restore the pick-up beam and crossfooter actuator to their home positions; means to normally retain the shiftable coupling member in effective position to engage its co-acting coupling member on the column register; guide rails between which the pick-up beam travels, one of the rails having a cam slot formed therein with a shoulder to restrict the cam slot; a projection on the shiftable coupling member, and located in the cam slot; an adjustable stop member; a stop arm connected with the pick-up beam and adapted to contact the stop member to arrest the pick-up beam and crossfooter actuator in their home positions; means to retract the stop member to enable the beam-restoring means to impart an extra limital travel to the stop arm and its pick-up beam and crossfooter actuator, during which the projection on the shiftable coupling member engages and is cammed to its ineffective position by the shoulder of the cam slot to silence the crossfooter register, and means on the stop member to lock the actuator in its extra limital position.

11. In a writing-computing machine, the combination with a frame; a carriage traveling thereon; a register on the carriage; and an actuator supported by the carriage and shiftable across the register; of actuator-positioning means, including a slide connected with the actuator; co-acting fixed and movable coupling members on the frame and slide, respectively; a cam surface traveling with the carriage, and contacted by the movable coupling member; means tending to draw the slide and movable coupling member in one direction to restore the actuator to its home position; means to normally arrest the slide when the actuator is in its home position; and manually operable means to withdraw the arresting means and free the slide and movable coupling member to the action of the restoring means, whereby to shift the actuator to an extra limital position and to engage the movable coupling member with an inclined face of the cam surface to displace the coupling.

12. In a machine of the class described, the combination with a plurality of spaced column registers; a plurality of spaced crossfooter registers paired with the respective column registers; an actuator common to the column registers; another actuator common to the crossfooter registers; the sets of column and crossfooter registers and their actuators being mounted for relative movement in letter spacing direction; the spacing between the column registers being different from the spacing between the crossfooter registers; and means to effect relative movements of equal extent between the actuators and their respective column and crossfooter registers when entering numbers in corresponding column and crossfooter registers, and for providing a counter-acting movement occurring coincidently with the relative movement between the actuator and those registers separated by the shorter distance, without affecting the relative movement between the remaining actuator and those registers separated by the longer distance, subsequently to the entry of the number in one pair of corresponding column and crossfooter registers.

13. In a machine of the class described, the combination with a plurality of successive column registers, and a carriage mounted for relative movement in line spacing direction; of a plurality of successive crossfooter registers, the spacing between which differs from the spacing between the column registers; traveling column and crossfooter actuators common to their respective column and to the crossfooter registers; releasable coupling means between one of the actuators and the respective column registers served by the remaining actuator; the coupling means adapted for movement independently of the column registers subsequently to its release from one of the column registers, to an extent equivalent to the difference in spacing between the adjacent column registers as compared with the spacing between adjacent crossfooter registers, and means operable relatively to the carriage to effect such independent motion irrespective of the carriage travel.

14. In a writing-calculating machine, the combination with a plurality of column registers, and a carriage mounted for relative movement in column spacing direction; of a plurality of crossfooter registers, the spacing between adjacent registers of which differs from the spacing between the adjacent column registers; actuators, one of which is bodily movable relatively to the other, and mounted on the carriage for movement therewith, one of the actuators being common to the column registers, and the remaining actuator being common to the crossfooter registers, to traverse the latter; means to normally retain the crossfooter actuator in, and return it to, its home position relatively to the crossfooter registers; the column register actuator mounted for advance in column spacing direction across the successive column registers; and a trip connection between the cross-footer actuator and the respective column registers, including coupling members on the respective column registers, and coupling dogs on the trip connection, said dogs being individual to the respective coupling members and relatively positioned to provide for a lost motion between one of said dogs and its coupling member equivalent in extent to the difference between the spacing between adjacent column registers and the spacing between the adjacent crossfooter registers.

15. In a writing-calculating machine, the combination with a traveling key carriage; a plurality of column registers past which the carriage advances, step by step; and an actuator traveling with the carriage and common to the column registers to serve the latter successively; of a plurality of crossfooter registers traveling step by step with the carriage and paired with corresponding column registers; an actuator common to the crossfooter registers and shiftably mounted on the carriage to travel therewith; the spacing between adjacent crossfooter registers differing from the spacing between adjacent column registers; a releasable connection between the crossfooter actuator and the column registers, including a carrier, spaced coupling members mounted thereon, and coupling members individual to the respective column registers, and releasably engaged thereby, to enable the crossfooter actuator to engage successive wheels of the crossfooter registers coincident with the engagement of the column register actuator with successive wheels of the corresponding column registers for the simultaneous entry of items into the respective column registers and their corresponding crossfooter registers, the coupling members on the carrier being spaced apart a different distance than the spacing intervals between the coupling members on adjacent column registers; means to release the coacting coupling members subsequently to the entry of each amount; and means operable upon the crossfooter actuator to shift the latter in a direction opposite to its progression when entering amounts on the registers to take up the difference provided by the predetermined spacing between the said coacting coupling members.

16. The combination with a plurality of fixed column registers; and an actuator common thereto and movable through equal increments of movement to engage the adding wheels of the adjacent column registers seriatim in entering items, a plurality of crossfooter registers individually corresponding with the individual column registers, and an actuator common to the crossfooter registers, the crossfooter actuator and its registers being relatively movable; of means to enable the simultaneous engagement of the respective actuators with adding wheels of corresponding denominations in the column and crossfooter registers, to effect the entry of successive items in successive column registers and successive crossfooter registers, respectively, not withstanding that the spacing interval between adjacent column registers is greater than the spacing interval between adjacent crossfooter registers, including a pick-up beam connected with the crossfooter actuator; means normally tending to maintain the pick-up beam and the crossfooter actuator in, and return them to, their home positions; and separate, automatically releasable coupling members mounted on the pick-up beam to connect the crossfooter actuator with the stationary column registers, one after the other, the releasable coupling members being so positioned relatively as to enable the beam-restoring means to back space the crossfooter actuator subsequently to the entry of an item in one column register and its crossfooter register, and prior to the entry of the succeeding item in the adjacent corresponding column and crossfooter registers, a distance equal to the difference in the widths of the spacing intervals between the column registers and crossfooter registers, respectively.

17. The combination with a plurality of spaced column registers; of a traveling carriage; a plurality of spaced crossfooter registers shiftable on the carriage, and with which the column registers are respectively related, the spacing between successive column registers differing from the spacing between successive crossfooter registers; actuators traveling with the carriage, and individual to the respective sets of column and of crossfooter registers; connecting means, including spaced coupling members associated with the respective column registers, and spaced, coupling members associated with the crossfooter actuator, releasably engaging the first-named coupling members to enable the actuators to shift in unison through like increments across the related column and crossfooter registers; the spacing between the coupling members associated with successive column registers differing from the spacing between the coupling members associated with the crossfooter actuator; and means to advance the last-named coupling members and associated crossfooter actuator intermediate their engagement with their co-acting coupling members, to reduce or offset the advance normally imparted to the crossfooter actuator as the actuators pass from the units wheels of related column and crossfooter registers to the wheels of highest order in the succeeding column and crossfooter registers.

18. The combination with a purality of spaced column registers; and a plurality of spaced crossfooter registers, with which the column registers are respectively related, the spacing between successive column registers differing in extent from the spacing between successive crossfooter registers; and actuators individual to the respective sets of column and of crossfooter registers; of a carrier connected with the crossfooter actuator; a plurality of coupling members mounted thereon in spaced relation; co-acting coupling members associated with the respective column registers, the space between successive coupling members on the carrier differing from the space between the co-acting coupling members on successive column registers; means to release the co-acting coupling members in timed relation with the escape of the actuator from their respective registers; and means to advance the carrier and its coupling members subsequent to such release, to enable the actuators to shift through unlike increments of travel when passing from the units wheels of related column and crossfooter registers to the wheels of highest order of the succeeding related column and crossfooter registers.

HARRY A. FOOTHORAP.